(12) United States Patent
Tran et al.

(10) Patent No.: US 6,665,284 B1
(45) Date of Patent: Dec. 16, 2003

(54) APPARATUS, AND ASSOCIATED METHOD, FOR RECEIVING DATA AT A RADIO DEVICE

(75) Inventors: Jean-Marie Tran, San Diego, CA (US); Thomas Kenney, San Diego, CA (US)

(73) Assignee: Nokia Mobile Phones, Ltd., Espoo (FI)

( * ) Notice: Subject to any disclaimer, the term of this patent is extended or adjusted under 35 U.S.C. 154(b) by 638 days.

(21) Appl. No.: 09/629,562

(22) Filed: Jul. 31, 2000

(51) Int. Cl.[7] .................................................. H04Q 7/00
(52) U.S. Cl. .................... 370/334; 370/335; 455/552.1; 455/553.1
(58) Field of Search ................................. 370/331, 334, 370/335, 329, 341, 342; 455/132, 552.1, 553.1

(56) References Cited

U.S. PATENT DOCUMENTS

| | | | | |
|---|---|---|---|---|
| 5,228,074 A | * | 7/1993 | Mizikovsky | 455/553.1 |
| 5,649,308 A | | 7/1997 | Andrews | 370/334 |
| 5,796,772 A | * | 8/1998 | Smith et al. | 375/130 |
| 5,940,452 A | | 8/1999 | Rich | 375/347 |
| 5,953,641 A | * | 9/1999 | Auvray | 455/74 |
| 5,963,852 A | * | 10/1999 | Schlang et al. | 455/76 |
| 6,292,474 B1 | * | 9/2001 | Ali et al. | 370/328 |
| 6,381,471 B1 | * | 4/2002 | Dvorkin | 455/552.1 |

FOREIGN PATENT DOCUMENTS

EP          0 823 789 A2     6/1997

* cited by examiner

Primary Examiner—Ajit Patel
Assistant Examiner—Chirag Shah
(74) Attorney, Agent, or Firm—Milan T. Patel

(57) ABSTRACT

Apparatus, and an associated method, for a communication station, such as a mobile station operable pursuant to an IS-95/IS-2000 communication service and an HDR (High Data Rate) data communication service. The receiver part of the communication station includes first and second RF (Radio Frequency) receive portions, separately tunable to communicate pursuant to the communication services. A hard handover of communication is not required to be effectuated to receive one, or the other, of the services.

20 Claims, 3 Drawing Sheets

APPARATUS, AND ASSOCIATED METHOD, FOR RECEIVING DATA AT A RADIO DEVICE

The present invention relates generally to a radio device operable to communicate data pursuant to a first data service, such as in an HDR (High Data Rate) system, and to communicate data pursuant to a second data service, such as in an IS-95/IS-2000 system. More particularly, the present invention relates to apparatus, and an associated method, by which to permit simultaneous reception at the radio device of data generated during operation of both of the data services. Through operation of an embodiment of the present invention, an existing practice by which a hard handoff at a radio device of communications from a first data channel to a second data channel is obviated. Interruption of reception of data therefore does not occur, and improved data communication results

BACKGROUND OF THE INVENTION

A communication system is formed, at a minimum, of a sending station and a receiving station interconnected by way of a communication channel. Information generated at the sending station is communicated to the receiving station upon the communication channel. A wide variety of different types of communication systems have been developed and are regularly utilized to effectuate communication of information between sending and receiving stations.

Advancements in communication technologies have permitted the development, and construction, of new types of communication systems. A radio communication system is exemplary of a type of communication system which has benefited from advancements in communication technologies. A communication channel formed between the sending and receiving stations of a radio communication system are defined upon a radio link. Because a radio link is utilized to form the communication channel, the conventional need to utilize wireline connections between the sending and receiving stations is obviated. Increased communication mobility is, as a result, inherent in a radio communication system in contrast to a conventional wireline system.

The communication capacity of a radio communication system, however, is sometimes constricted as a result of bandwidth limitations. Only a limited amount of the electromagnetic spectrum is typically allocated to be used by a particular radio communication system and upon which communication channels can be defined. Communication capacity increase of a radio communication system is, therefore, sometimes limited by such allocation of bandwidth. Increase of the communication capacity of the radio communication system, therefore, is sometimes only possible by increasing the efficiency by which the allocated spectrum is used.

Digital communication techniques are amongst the advancements in communication technologies which have advantageously been implemented in various communication systems. Digital communication techniques permit the bandwidth efficiency of communications upon a communication channel in a communication system to be increased. Due to the particular need to efficiently utilize the bandwidth allocated in a radio communication system, the use of such digital techniques is particularly advantageously utilized in a radio communication system.

A cellular communication system is exemplary of a radio communication system in which digital communication techniques are regularly utilized. Various cellular standards have been promulgated, and cellular communication systems are generally constructed to be operable in compliance with a selected one, or more, of the standards. For instance, a cellular standard, referred to as the IS-95/IS-2000 standard defines a CDMA (Code-Division, Multiple Access)-based cellular communication system. Cellular communication systems in compliance with this standard have been installed throughout wide geographical areas.

Users of a cellular communication system are able to communicate telephonically by way of mobile stations to communicate voice information, herein referred to also as voice data. Utilization of digital communication techniques has also facilitated the communication of other types of data, herein referred to as non-voice data. Various standards have also been developed which pertain to the communication of non-voice data. For instance, an HDR (High Data Rate) data communication system standard has been promulgated. A communication system constructed to comply with the HDR standard provides for the communication of non-voice information at high data rates.

Mobile stations have been constructed to permit communication therethrough of both voice, and other, data generated pursuant to operation of an IS-95/IS-2000 system as well as also non-voice, and other, data generated during operation of an HDR system. The IS-2000 system, for instance, is capable of data rates of 614.4 kbps while HDR data rates approach 2.45 Mbps. Data generated during operation of the HDR system is transmitted to a mobile station within a first frequency band, and IS-95/IS-2000 data transmitted to the mobile station is transmitted within a second frequency band. Conventional mobile terminals operable to receive data generated pursuant to data generated pursuant to both of the systems include a receive portion which must effectuate a hard handover between frequency bands, alternately to receive the data generated during operation of the separate systems. For instance, the mobile terminal is normally tuned to the frequency band upon which the HDR data is transmitted but, a hard handover to the frequency band upon which the IS-95/IS-2000 data is transmitted is effectuated at selected intervals to detect transmission of information such as IS-95/IS-2000 where the paging channel carries targeted user information. Subsequent to the hard handover to the frequency band upon which the data is transmitted, the mobile terminal is unable to detect the data generated pursuant to operation of the HDR data system. Interruption of the reception of the HDR data results.

If a manner could be provided by which to permit simultaneous reception of data generated during operation of both systems, improved communication would be permitted.

It is in light of this background information related to the communication of data in a radio communication system that the significant improvements of the present invention have evolved.

SUMMARY OF THE INVENTION

The present invention, accordingly, advantageously provides apparatus, and an associated method, for a radio device to facilitate radio reception thereat of both first data generated pursuant to a first data service and second data generated pursuant to a second data service.

Through operation of an embodiment of the present invention, a manner is provided by which to permit simultaneous reception at the radio device of both the first data and the second data. Simultaneous reception of both the first data and the second data is achieved by obviating the need to perform a hard handoff of communications at the radio device to receive only alternately the first data and the second data. Because simultaneous reception of the first data and the second data is permitted, a communication interruption due to the conventional hard handoff of communications does not occur.

In one aspect of the present invention, a receive portion of a radio device is provided with a first RF (Radio Frequency) received chain and a second RF (Radio Frequency) receive chain positioned in parallel and permitting of simultaneous operation. During normal operation, both of the receive chains are together operable as a diversity receiver to receive first data generated pursuant to a first communication service. At selected intervals, one of the receive chains is tuned to a paging channel associated with with IS-95/IS-2000 with a second communication service. When tuned to the frequency channel associated with the second communication service, a determination is made as to whether second data is to be communicated to the mobile terminal. If so, the receive portion, already tuned to the frequency band upon which the second data is to be communicated, remains tuned to such frequency band. Otherwise, the receive portion is retuned back to the frequency band upon which the non-voice data is communicated. Although diversity reception is no longer performed when one of the receive portions is retuned to the frequency band upon which the second data is to be communicated, the other of the RF receive portions remains tuned to the frequency band upon which the first data is communicated. Thereby, continuous reception of the first data is permitted.

In another aspect of the present invention, the mobile terminal notifies the sender of the first data an indication of the operation of the receive portions either together as a diversity receiver or tuned separately to the two different frequency bands. When the receive portions are together operable as a diversity receiver, first data is permitted to be provided to the mobile terminal at an equal or higher rate band than when only one of the RF receive portions is tuned to the frequency band upon which the first data is communicated.

In another aspect of the present invention, one of the RF receive portions is periodically tuned out of the frequency band associated with the second data service and to a paging channel defined pursuant to the second data service. Paging signals are transmitted upon the paging channel to alert the mobile terminal of subsequent second data to be communicated thereto. If a paging signal is detected, the receive portion is retuned out of the paging channel and to a communication channel, within the frequency band associated with the second data service, upon which the second data is thereafter communicated. If, conversely, the paging signal is not detected, the receive portion is retuned back to the frequency band associated with the first data service, and the mobile terminal is again operated as a diversity receiver.

In another aspect of the present invention, when a paging signal is detected, the transmit portion of the mobile terminal is also caused to be tuned to the frequency band associated with the second data service. Thereby, the mobile terminal is operable both to receive and to send voice data pursuant to the second data service.

In one implementation, a communication station, such as a mobile station, is operable pursuant to an IS-95/IS-2000 cellular communication system and also pursuant to an HDR (High Data Rate) data system. The mobile station is permitted, through operation of an embodiment of the present invention, simultaneously to receive both data generated pursuant to the IS-95/IS-2000 system and data generated pursuant to the HDR data system. The communication station includes a first and a second RF (Radio Frequency) receive portions area. The first RF receive portion is tunable to a frequency band associated with the HDR data service. And, the second RF receive portion is tunable both to the frequency band associated with the HDR data service and also to a frequency band associated with the IS-95/IS-2000 service. The second RF receive portion is selectably tuned to the frequency band associated with the IS-95/IS-2000 service, thereby to permit simultaneous reception of both the HDR data and the IS-95/IS-2000 data.

In these and other aspects, therefore, apparatus, and an associated method, is provided for a radio device operable pursuant to a first data service and pursuant to a second data service. The apparatus is selectably operable simultaneously to receive data generated pursuant to the first data service and second data generated pursuant to the second data service. A first RF (Radio Frequency) receive portion is at least selectably tunable to a channel upon which the first data generated during operation of the first data service is transmitted to the radio device. A second RF (Radio Frequency) receive portion is at least selectably tunable to the channel upon which the first data generated during operation of the first data service is transmitted and also to a channel upon which the second data generated pursuant to the second data service is transmitted. When tuned to the channel upon which the second data is transmitted, simultaneous reception of both the first data and the second data is effectuated.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
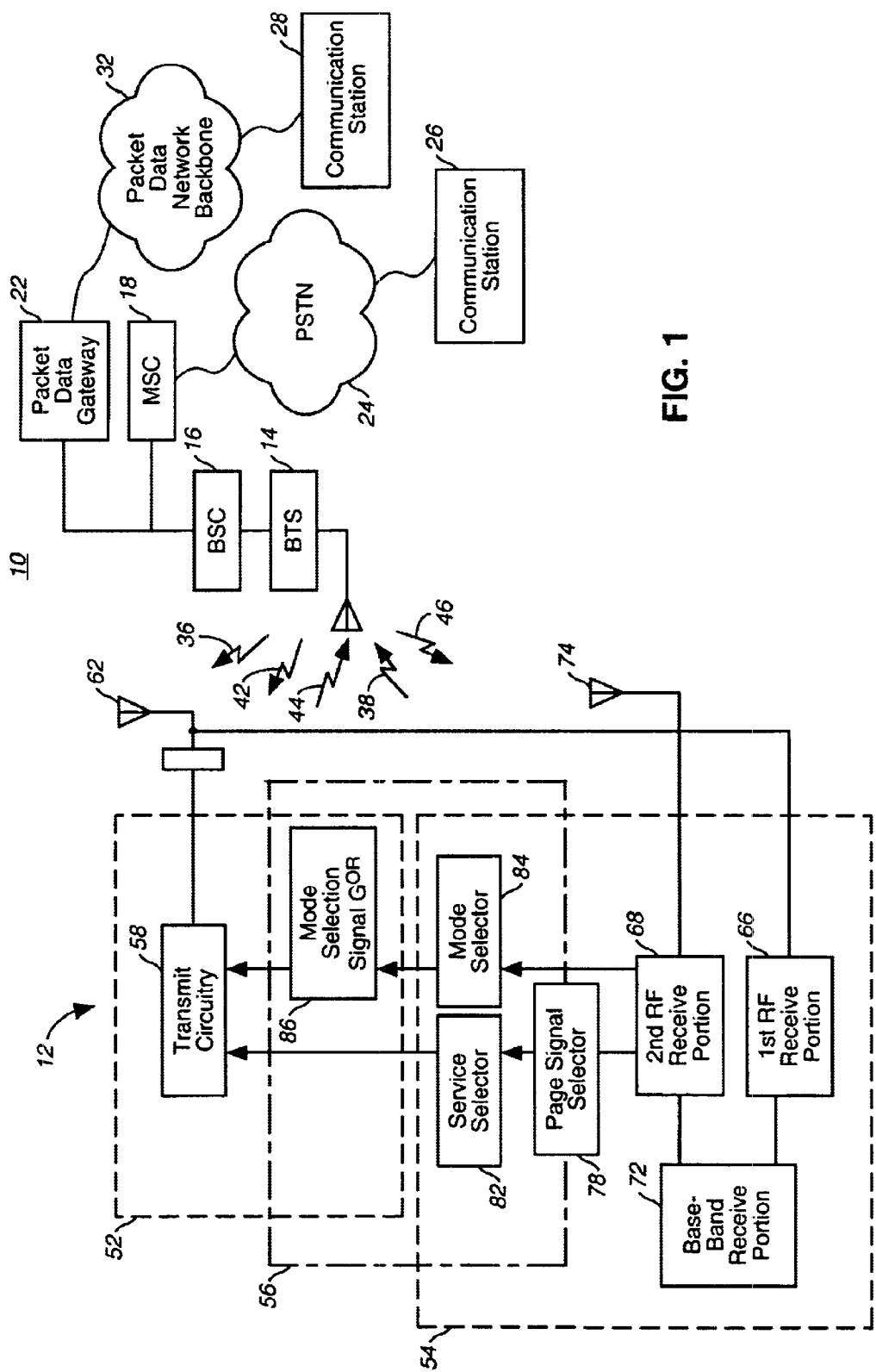
FIG. 1. illustrates functional block diagram of a communication system in which an embodiment of the present invention is operable.

Referring first to FIG. 1, a communication system, shown generally at 10, provides for radio communications with a mobile station 12. While only a single mobile station 12 is shown in the figure, the communication system is a multi-user system permitting communications with a large number of mobile stations analogous to the mobile station 12.

In the exemplary implementation, the communication system 10 forms a cellular communication system operable pursuant to the IS-95/IS-2000 standard. The standard pertains to a CDMA (Code Division, Multiple Access) communication scheme. And, the communication system provides for HDR (High Data Rate) data communication services. Other types of radio communication systems can similarly be represented. While the following description shall describe operation of an embodiment of the present invention with respect to the exemplary communication system operable pursuant to the IS-95/IS-2000 and HDR standards, in other implementations, embodiments of the present invention can analogously be implemented in other types of communication systems.

The communication system includes network infrastructure of a radio part thereof, here shown to include a Base Transceiver Station (BTS) 14 operable to transceive communication signals with the mobile station 12 by way of a radio link formed therebetween. The base transceiver station is, in turn, coupled to a Base Station Controller (BSC) 16 which is operable, amongst other things, to control operation of the base transceiver station. And, in turn, the base station controller is coupled to a Mobile Switching Center (MSC) 18 and, also, to a packet data gateway 22.

The mobile switching center 18 is connected by way of an external network, here a Public-Switched Telephonic Network (PSTN) 24 with a remote communication station 26. A communication path is formable between the communication station 26 and the mobile station 12 by way of the PSTN, the network infrastructure of the communication system, and a radio link formed between the mobile station and the base transceiver station 14. Communication is effectuable upon the communication path formed therebetween.

The packet data gateway 22, analogously, is also coupled to a communication station, here the communication station 28, by way of a packet data network backbone 32. A communication path is formable between the communication station 28 and the mobile station 12 by way of the backbone 25 32, the network infrastructure of the communication system, and a radio link formed between the mobile station 12 the base transceiver station 14.

Two-way communication between the mobile station and the base transceiver station by way of the radio link to effectuate both IS-95/IS-2000 data and HDR data is possible. Here, the arrow 36 is representative of a forward link communication of IS-95/IS-2000 data by the base transceiver station to the mobile station. And, the arrow 38 is representative of reverse link communication by the mobile station to the base transceiver station of IS-95/IS-2000 data.

Analogously, the arrow 42 is representative of forward link transmission of HDR data by the base transceiver station to the mobile station. And the arrow 44 is representative of the transmission by the mobile station upon a reverse link channel to the base transceiver station HDR data. An arrow 46 is also shown to extend between the base transceiver station and the mobile station. The arrow 46 is representative a paging signal transmitted by the base transceiver station to alert the mobile station of IS-95/IS-2000 data to be sent to the mobile station at the initiation of a communication session. The paging signal is transmitted upon a paging channel defined in the IS-95/IS-2000 system.

Through operation of an embodiment of the present invention, the mobile station 12 is operable to receive simultaneously both the HDR data and the IS-95/IS-2000 data so as not to interrupt continued communication of the HDR data when IS-95/IS-2000 data is to be communicated between the base transceiver station and the mobile station. Improved communications are thereby possible through operation of an embodiment of the present invention in contrast to conventional mobile stations which generally are not capable of simultaneous reception of both HDR data and IS-95/IS-2000 data, or the like.

The mobile station 12 forms a radio transceiver having a transmitter part 52 and a receiver part 54. Control apparatus 56 is overlaid upon both the transmitter and receiver parts 52 and 54. Functional elements of the control apparatus are operable to control operation of the respective parts 52 and 54 of the mobile station.

The transmitter part here is shown to include transmit circuitry 58. The transmit circuitry is selectably operable to generate the HDR data and the IS-95/IS-2000 data communicated on the reverse links 38 and 44. The transmit circuitry 58 is coupled to an antenna transducer 62 which is operable to transduce, out of electrical form and into electromagnetic form, the signals generated by the transmit circuitry 58.

The receiver part 54 of the mobile station is here shown to include a first RF (Radio Frequency) receive portion 66 and a second RF portion 68. The first and second receive portions are coupled to a baseband receive portion 72.

The first RF receive portion 66 is tunable to a frequency band upon which HDR data is transmitted to the mobile station, here represented in the figure at the forward link 36. Such data, detected at the mobile station, is converted out of electromagnetic form and into electrical form by the antenna transducer 62, thereafter to be provided to the first RF receive portion. The first RF receive portion performs various receive operations upon the signal containing the HDR data, converts the signal to baseband form, and provides the signal to the baseband receive portion 72 whereat additional receive functions are performed thereon.

The second RF receive portion 68 is also tunable to the frequency band upon which the HDR data is communicated to the mobile station. The second RF receive portion is further also selectably tunable to a frequency band upon which the IS-95/IS-2000 data is communicated to the mobile station. The second RF receive portion is coupled to an antenna transducer 74 which is operable to transduce, out of electromagnetic form and into electrical form, signals communicated to the mobile station.

When the second RF receive portion is tuned to the frequency band upon which the HDR data is communicated to the mobile station, the receiver part 54 of the mobile station is operable as a diversity receiver. The first and second RF receive portions are coupled to separate antenna transducers, namely, the antenna transducers 62 and 74, thereby to provide receive diversity.

When, instead, the second RF receive portion is tuned out of the frequency band associated with the HDR data service and into a frequency band associated with the IS-95/IS-2000 service, the receiver part of the mobile station no longer functions as a diversity receiver but HDR data is continued to be received, and acted thereon, by way of the first RF receive portion 66. The second RF receive portion, once tuned to the frequency band associated with the IS-95/IS-2000 service, is able to detect and operate upon IS-95/IS-2000 data. Thereby, concurrent reception of both the HDR data and the IS-95/IS-2000 data is permitted. Reception of the HDR data continues even when the IS-95/IS-2000 data is communicated to the mobile station.

In exemplary operation of an embodiment of the present invention, the second RF receive portion is caused to be tuned to the frequency band upon which the IS-95/IS-2000 data is transmitted at selected intervals. And, more particularly, the second RF receive portion is caused to be tuned to a paging channel upon which paging signals are broadcast by the network infrastructure to alert the mobile station of subsequent transmission of the IS-95/IS-2000 data. If a page signal is detected, the second RF receive portion further is tuned to a data channel upon which the IS-95/IS-2000 data is thereafter communicated. The control apparatus 56 includes a page signal detector 78 which is operable to detect reception of a paging signal transmitted to the mobile station upon the paging channel. If a paging signal is detected, as just noted, the second RF receive portion remains tuned to the frequency band associated with IS-95/IS-2000 service, thereafter to receive the IS-95/IS-2000 data. Indications of detection by the page signal detector of such detection are provided to a service selector 82 operable to select service of the mobile station to communicate pursuant to the IS-95/IS-2000 service. Selections made by the service selector 82 are provided to the transmit circuitry 58 of the transmitter part 52 to cause operation of the transmitter part pursuant to the IS-95/IS-2000 service.

The control apparatus 56 further includes a mode selector 84 operable to select the operational mode of the mobile station. When the receiver part 54 of the mobile station is operated as a diversity receiver, the data rate at which the receiver part is able to operate upon the receive HDR data is potentially greater due to spatial diversity afforded than when only a single one of the receive portions 66 and 68 is tuned to receive the HDR data. Responsive to selection by the mode selector of the mode in which the receiver part is to be operated upon, an indication is provided to a mode selection signal generator 86. The mode select signal generator generates a signal which is provided to the transmit circuitry 58 to be transmitted therefrom to the network infrastructure of the communication system. Generation of the mode select signal of a selected value indicates, when detected at the network infrastructure, that the HDR data is to be communicated to the mobile station at a first rate when the receiver part of the mobile station is operated as a diversity receiver and at a second rate when only a single one of the RF receive portions is operable to receive the HDR data.

Thereby, through operation of an embodiment of the present invention, simultaneous reception of IS-95/IS-2000 data and HDR data is permitted, when appropriate, and at other times, the receiver part of the mobile station is operated as a diversity receiver. Indications are provided to the network infrastructure to instruct the network infrastructure at what rate the HDR data is to be communicated to the mobile station, all dependent upon the manner by which the receiver part of the mobile station is operated.

Figure 2:
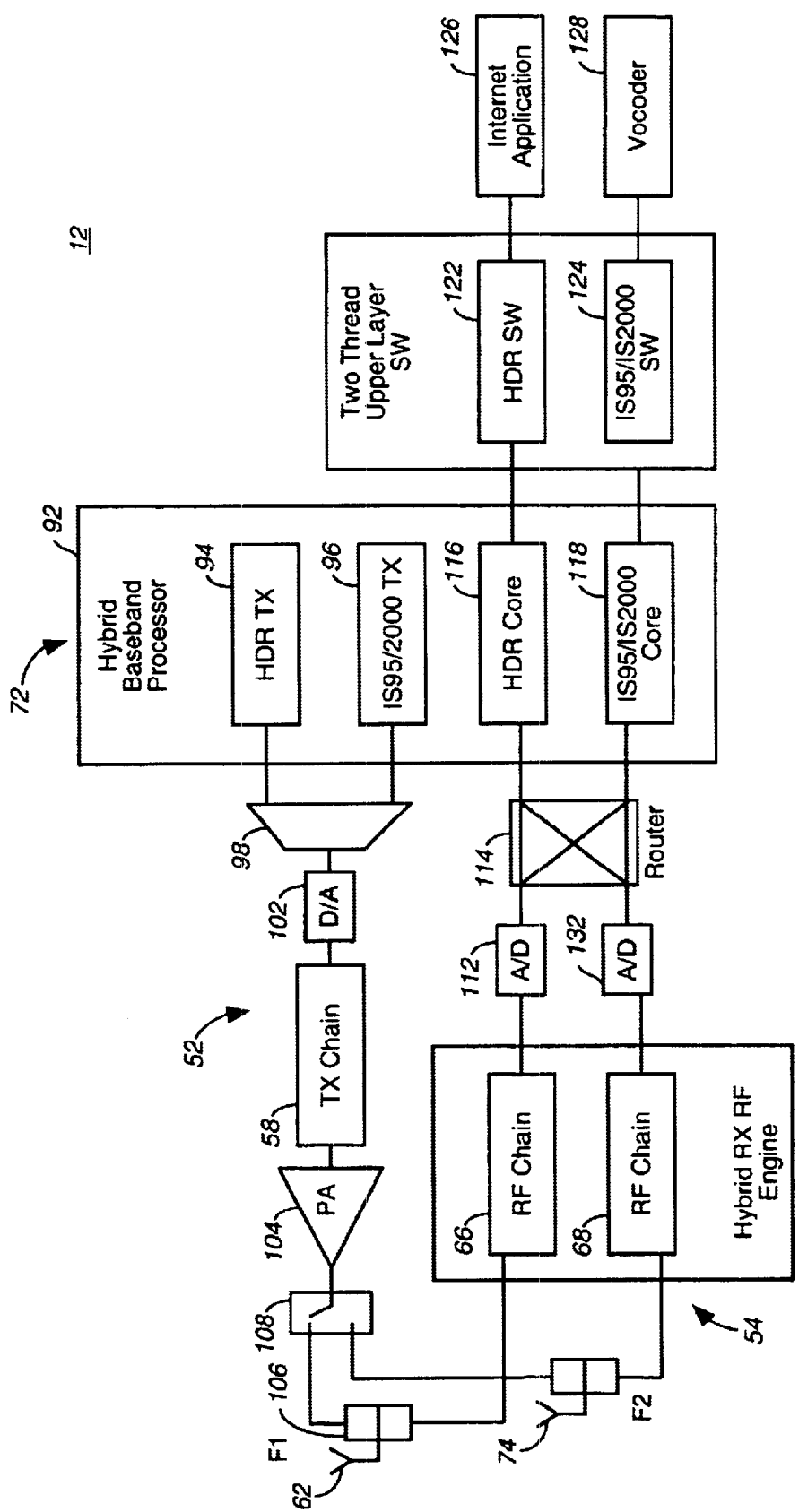
FIG. 2. illustrates a functional block diagram of a mobile station forming a portion of the communication system shown in FIG. 1 in greater detail.

Turning next to FIG. 2, the mobile station 12 is again shown to include transmitter and receiver parts 52 and 54. And, the first and second RF receive portions 66 and 68 are again shown to form portions of the receiver part, coupled to a baseband receive portion 72.

The transmitter part includes portions embodied at a Hybrid Baseband Processor (HBP) 92. Separate functional portions of the processor, here shown at 94 and 96, are operable to act upon HDR data and IS-95/IS-2000 data to be communicated by the mobile station. The data is provided to an element 98 and then digitized at a digital-to-analog converter 102. Thereafter, the digitized data is provided to the transmit circuitry 58 at which transmit functions are performed thereon. Then, a signal containing the data is amplified by a power amplifier 104 and provided to the antenna transducer 62 by way of a filter duplexer 106.

The first RF receive portion 66 is also here shown to be coupled to the antenna transducer 62 by way of the filter duplexer 106. An analog-to-digital converter 12 is coupled to the first RF receive portion to digitize signals received thereat. The digitized representations are selectably applied to functional element of the hybrid baseband processor 92 by way of a router 114. The functional elements of the hybrid baseband processor associated with the baseband receive portion includes an HDR core 116 and an IS-95/IS-2000 core 118. The HDR core 16, in turn, is coupled to upper layer software forming HDR software 122. Analogously, the IS-95/IS-2000 core extends to upper layer software forming IS-95/IS-2000 software 124. Operation of the software 122 is utilized, e.g., Internet applications 126, and operation of the software 124 is used, e.g., to provide data to a vocoder 128.

The second RF receive portion 68 extends to an analog-to-digital converter 132, and digital representations generated thereat are selectably applied to the functional elements of the hybrid baseband processor 92 by way of the router 114.

During operation of the mobile station, the receiver part thereof is selectably alterable either as a diversity receiver to receive HDR data transmitted thereto in which signals containing the data detected at the antenna transducer 62 are provided to the first RF receive portion 62, and signals containing the data detected at the antenna transducer 74 are provided to the second RF receive portion 68. When, conversely, the second RF receive portion is tuned to the frequency band associated with the IS-95/IS-2000 service, the separate receive portions 66 and 68 operate independently to process the different data types, respectively.

The router 114 is operable to route digitized representations of the data acted upon by the respective RF receive portions 66 and 68 to the appropriate ones of the functional elements 116 and 118.

A channel on the frequency band associated with the HDR data service, is, for instance, referred to as f1, and a frequency channel associated with the IS-95/IS-2000 service is referred to as f2. While conventional mobile stations effectuate a hard handoff of the receive portion thereof out of the channel f1 to the channel f2 at periodic intervals to detect whether IS-95/IS-2000 data, through operation of an embodiment of the present invention, the need to effectuate a hard handoff is obviated. Instead, the second RF receive portion is tuned to the channel f2 to monitor for incoming data while the first RF receive portion remains tuned to the channel f1. Digitized representations of the signals acted upon by the first RF receive portion are directed by the router 114 to the HDR core of the baseband processor 92. Prior to entering this mode, the mobile station notifies the HDR network, as described above, of the need for a reduced throughput rate, together with a change in selection of the modulation and coding scheme.

Digitized representations of signals acted upon by the second RF receive portion are routed by the router to the IS-95/IS-2000 core functional element 18 of the hybrid baseband processor. A two-thread upper layer protocol of the upper layer software is used to support HDR operations and concurrent monitoring of a paging channel of the IS-95/IS-2000 service.

Reverse link operations correspond to those of the first RF receive portion to be operable pursuant to the HDR data service. Then, uncompromised HDR data operation is provided while also avoiding complex scheduler operations of the mobile stations to monitor an IS-95/IS-2000 paging channel conventionally otherwise required.

If a paging signal is detected, a message requesting mapping of HDR service to IS-2000 or requesting suspension of such service is transmitted to the HDR network, and partial hard-handoff is performed to tune the transmitter part of the mobile station to be operable pursuant to the IS-95/ IS-2000 service. In the exemplary implementation, the switch element 108 is also switched so that the transmit signal is transduced by the antenna transducer 74 rather than the antenna transducer 62. Additionally, if desired, both of the RF receive portions can be tuned to the IS-95/IS-2000 channel so as to operate the receiver part again as a diversity receiver. Such operation may be beneficial if the HDR data services are mapped to services pursuant to the IS-95/IS-2000 communication service. Alternately, monitoring of the HDR channel is continued, thereby to facilitate a quick return to HDR services as soon as the IS-95/IS-2000 communication session is completed.

Structure of the mobile station is also operable when the channels associated with f1 and f2 belong to a MC 3×carrier set. The carrier set is, e.g., denoted by the frequency set [F−1, F, F+1] in which f1 and f2 belong to the set. In operation, an advantageous reduction of hardware resources is permitted while retaining the advantages of the structure of the receiver part of the mobile station. Support of concurrent voice and data services is provided.

Figure 3:
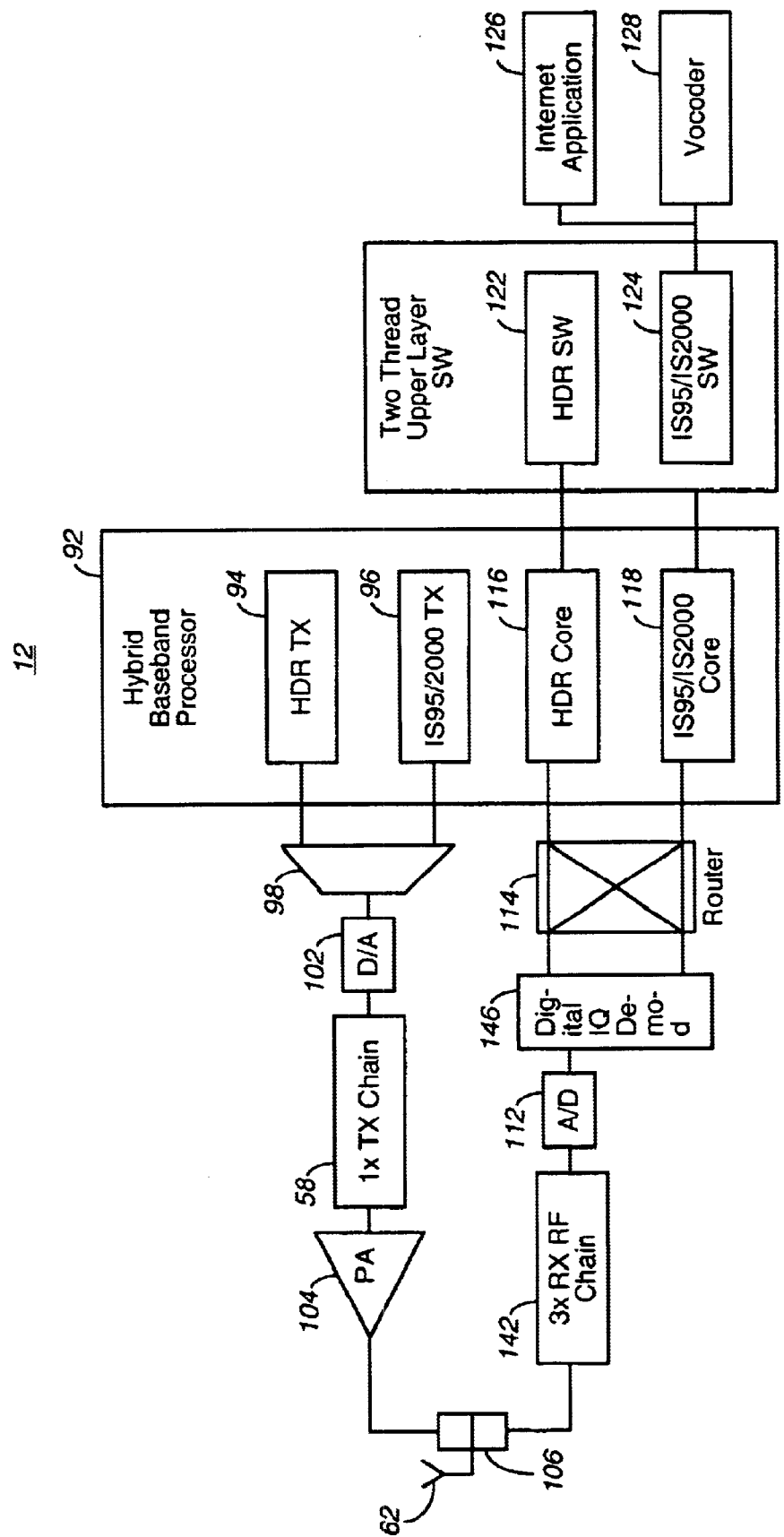
FIG. 3. also illustrates a functional block diagram of the mobile station forming a portion of the communication system shown in FIG. 1, here in which the mobile station is operable pursuant to a 3×mc (multi-carrier) communication system in which a combination of data service and voice service is utilized to communicate information with the mobile station.

FIG. 3 illustrates the mobile station 12 operable to communicate pursuant to the MC 3×carrier set. Structure corresponding to that earlier shown with respect to the mobile station 12 shown in FIG. 2 is commonly-referenced and shall not again be described. Here, the receiver part of the mobile station includes a 3×RX RF chain 142 positioned between the duplexer filter 106 and an analog-to digital converter 112. Digital representations generated by the converter 112 are provided to a digital IQ demodulator 146 and, in turn, to the router 114. The element 142 includes a superheterodyne architecture with a low noise amplifier, a mixer, and a 3×SAW filter, an IQ demodulator, and 3×baseband filter. And, the element 146 includes a filter together with the digital IQ demodulator which forms a sampled IQ signal for each one of the three channels of the 3×MC forward link. Channelization is provided by the demodulator 146. Alternatively, the IQ signals of two out of the three channels may be generated.

In this configuration, one channel forms a voice channel and another channel forms a HDR channel. The A/D converter 112 is capable of sampling an entire receive frequency band which includes frequencies F−1, F, and F+1. A router directs the channel's IQ signal to the HDR core 116 of the baseband processor 92. The elements 122 and 124 of the two-thread upper layer software are capable of supporting two applications, i.e., real time voice and non-real time HDR data.

Operation of the mobile station corresponds to operation of the mobile station described with respect to FIG. 2. For instance, if the receiver part is operable on an HDR system at, e.g., a frequency F, its reverse link corresponds to F−1, F, or F+1. A voice channel is deployed, e.g., at F+1 with its reverse link corresponding to F+1. The mobile station simultaneously monitors the HDR channel and the voice channel on the forward link. While in the HDR mode, the mobile station transmits on the appropriate HDR reverse link frequency. If the mobile station receives a paging signal and the terminal is assigned to a traffic channel, the reverse link signal frequency is changed to F+1. If HDR data services are being provided and need to be maintained concurrently with voice services, the mobile station starts a supplemental channel transmission on the reverse link to carry all HDR feedback information. Thereby, concurrent voice and HDR services are implemented.

Also, in this implementation, multiple services are possible using a combination of HDR data services and IS-95/ IS-2000 services. Each carrier is available to support either of the services providing a mix, forming, e.g., three HDR carriers, two HDR carriers, and one IS-95/IS-2000 carriers, as well as three IS-95/IS-2000 carriers. System utilization is better able to be maximized when mixed services are required.

Thereby, through operation of various embodiments of the present invention, improved communication service is available due to the selectable nature of the services to which the separate RF receive portions are operable.

The previous descriptions are of preferred examples for implementing the invention, and the scope of the invention should not necessarily be limited by this description. The scope of the present invention is defined by the following claims.

We claim:

1. In a radio device operable pursuant to a first data service and pursuant to a second data service, an improvement of receiver apparatus selectably operable simultaneously to receive first data generated pursuant to the first data service and second data generated pursuant to the second data service, said apparatus comprising:

a first RF (Radio Frequency) receive portion at least selectably tunable to a channel upon which the first data generated during operation of the first data service is transmitted to the radio device, and a second RF (Radio Frequency) receive portion at least selectably tunable to the channel upon which the first data generated during operation of the first data service is transmitted and to a channel upon which the second data generated pursuant to the second data service is transmitted such that, when tuned to the channel upon which the second data is transmitted, simultaneous reception of both the first data and the second data is effectuated.

2. The apparatus of claim 1 wherein said first RF receive portion further comprises a first antenna transducer and said second RF receive portion further comprises a second antenna transducer, said first RF receive portion and said second RF receive portion together operable as a diversity receiver when said second RF receive portion is tuned to the channel upon which the first data generated during operation of the first data service is transmitted.

3. The apparatus of claim 2 wherein communications effectuated pursuant to the first data service are effectuated at a first rate when said first RF receive portion and said second RF receive portion are together operable as a diversity receiver and wherein communications effectuated pursuant to the first data service are effectuated at a second rate when said second RF receive portion is tuned to the channel upon which the second data is transmitted, the first rate greater than the second rate.

4. The apparatus of claim 3 wherein the radio device further comprises transmitter apparatus selectably operable pursuant to the first data service and pursuant to the second data service, and wherein said receiver apparatus further comprises a mode selector for selecting at which of the first rate and the second rate the first data service is to be effectuated and for indicating to the transmitter apparatus selections made thereat.

5. In the radio device of claim 4, the radio device operable in a radio communication system to communicate with network infrastructure of the radio communication system, a further improvement for the transmitter apparatus of:

a mode selection signal generator operable responsive to detection of indications provided to the transmitter apparatus of selections made at said mode selector, said mode selection signal generator for generating a mode selection signal for transmission to the network infrastructure, the mode selection signal of values representative of selections made by said mode selector.

6. The apparatus of claim 1 wherein the second data service defines a paging channel upon which to transmit pages to the radio device and wherein the second data service defines a paging channel upon which to transmit pages to the radio device and wherein said second RF receive portion is further tuned, at selected intervals, to the paging channel.

7. The apparatus of claim 6 wherein said second RF receive portion is tuned to the channel upon which the second data is transmitted upon detection of a page transmitted upon the paging channel.

8. The apparatus of claim 3 wherein the radio device further comprises transmitter apparatus selectably operable pursuant to the first data service and pursuant to the second data service, and wherein said receiver apparatus further comprises a service selector operable responsive to detection of the paging signals transmitted to the radio device upon the paging channel, said service selector for selecting operation of the transmitter apparatus pursuant to the second data service and for indicating to the transmitter apparatus selection of subsequent communications by the transmitter apparatus to be pursuant to the second data service.

9. The apparatus of claim 8 wherein the transmitter apparatus is alternately tunable to communicate pursuant to the second data service and wherein selection by said service selector causes the transmitter apparatus to communicate pursuant to the second data service.

10. The apparatus of claim 1 wherein the channel upon which the first data generated during operation of the first data service is transmitted and to which said first RF receive portion is tunable is located within a first frequency band.

11. The apparatus of claim 10 wherein the channel upon which the second data generated during operation of the second data service is transmitted and to which said second RF receive portion is tunable is located within a second frequency band.

12. The apparatus of claim 11 wherein the first data service comprises a HDR (High Data Rate) data communication service, wherein second data service comprises a CDMA (Code-Division, Multiple-Access)-based communication service, wherein said first RF receive portion is tunable to the channel upon which HDR data is communicated and wherein said second RF receive portion is selectably further tunable to the channel upon which CDMA-based communications are communicated.

13. In a method for communicating pursuant to a first data service and pursuant to a second data service with a radio device, an improvement of a method for simultaneously receiving data generated pursuant to the first data service and pursuant to the second data service, said method comprising:

timing a first RF (Radio Frequency) receive portion to a channel upon which the first data generated during operation of the first data service is transmitted to the radio device;

tuning a second RF (Radio Frequency) receive portion to the channel upon which the first data generated during operation of the first data service is transmitted such that, when tuned thereto, the first and second RF receive portions, respectively, together are operable as a diversity receiver; and selectably tuning the second RF receive portion to a channel upon which the second data generated pursuant to the second data service is transmitted such that, when tuned thereto, simultaneous reception of both the first data and the second data is effectuated.

14. The method of claim 13 wherein communication effectuated pursuant to the first data service are effectuated at a first rate when the second RF receive portion is tuned during said operation of tuning the second RF receive portion to the channel upon which the first data generated during operation of the first data service is transmitted and at a second rate when the second RF receive portion is tuned during said operation of selectably tuning the second RF receive portion, the first rate greater than the second rate.

15. The method of claim 14 wherein the radio device further comprises transmitter apparatus selectably operable pursuant to the first data service and pursuant to the second data service, said method further comprising the operation of:

indicating to the transmitter apparatus at which of the first rate and the second rate the first data service is to be effectuated; and transmitting by the transmitter apparatus a rate selection signal of values representative of indications provided during said operation of indicating to the transmitter apparatus.

16. The method of claim 15 wherein the second data service defines a paging channel upon which to transmit pages to the radio device, said method comprising the additional operation of selectably tuning, at selected intervals, the second RF receive portion to the paging channel.

17. The method of claim 16 comprising the additional operation of:

detecting a paging signal transmitted upon the paging channel; and causing selection of tuning, during said operation of selectably tuning, of the second RF receive portion to the channel upon which the second data generated pursuant to the second data service.

18. The method of claim 17 further comprising the additional operation of causing the transmitter apparatus to communicate pursuant to the second data service subsequent to detection, during said operation of detecting, of the paging signal.

19. The method of claim 13 wherein the channel upon which the data generated during operation of the first data service is transmitted is located within a first frequency band and wherein said operation of tuning the first RF receive portion comprises tuning the first RF receive portion to the first frequency band.

20. The method of claim 13 wherein the first data service comprises a HDR (High Data Rate) data communication service, wherein the second data service comprises a CDMA (Code-Division, Multiple-Access)-based communication service, wherein said operations of tuning the first RF receiver portion and of tuning the second RF receive portion tune the first and second RF receive portions, respectively, to receive HDR data and wherein said operation of selectably tuning the second RF receive portion tunes the second RF receive portion to receive CDMA-based communication signals.

* * * * *